United States Patent
Cottard (10) Patent No.: US 10,435,043 B2
(45) Date of Patent: Oct. 8, 2019

(54) FUNICULAR DRIVEN BY A CABLE WITH TWO TOWING SECTIONS AND METHOD FOR CONTROLLING SUCH A FUNICULAR

(71) Applicant: Agence Nationale Pour La Gestion Des Déchets Radioactifs, Chatenay-malabry (FR)

(72) Inventor: Guillaume Cottard, Annecy-le-Vieux (FR)

(73) Assignee: Agence Nationale Pour La Gestion Des Déchets Radioactifs, Chatenay-Malabry (FR)

( * ) Notice: Subject to any disclaimer, the term of this patent is extended or adjusted under 35 U.S.C. 154(b) by 222 days.

(21) Appl. No.: 15/508,987

(22) PCT Filed: Sep. 4, 2015

(86) PCT No.: PCT/EP2015/070213
§ 371 (c)(1),
(2) Date: Mar. 6, 2017

(87) PCT Pub. No.: WO2016/034697
PCT Pub. Date: Mar. 10, 2016

(65) Prior Publication Data
US 2017/0274911 A1 Sep. 28, 2017

(30) Foreign Application Priority Data

Sep. 4, 2014 (FR) ...................................... 14 58266
Sep. 4, 2014 (FR) ...................................... 14 58268

(51) Int. Cl.
*B61B 9/00* (2006.01)
*B61F 5/02* (2006.01)
(Continued)

(52) U.S. Cl.
CPC .................. *B61F 5/02* (2013.01); *B61B 9/00* (2013.01); *B61B 12/007* (2013.01);
(Continued)

(58) Field of Classification Search
CPC ... B61B 12/007; B61B 12/022; B61B 12/026; B61B 12/028; B61B 12/105;
(Continued)

(56) References Cited

U.S. PATENT DOCUMENTS 413,158 A 10/1889 Askew
449,466 A 3/1891 Cutshaw
(Continued)

FOREIGN PATENT DOCUMENTS

CH 415 731 A 6/1966
DE 2407273 B1 7/1975
(Continued)

OTHER PUBLICATIONS

International Search Report and Written Opinion, prepared by the European Patent Office acting as the ISA, for International Application PCT/EP2015/070213 dated Nov. 10, 2015.

*Primary Examiner* — Mark T Le
(74) *Attorney, Agent, or Firm* — McCarter & English, LLP (57) ABSTRACT

A funicular intended particularly for transporting heavy loads between an upstream station (10) and a downstream station (12), comprises a track (14), preferably a railway, connecting the upstream station (10) to the downstream station (12), a vehicle (16) running on the track (14) and at least one towing cable (30) in closed loop having a first towing section (32.1) passing over a first pulley (20.1) of the upstream station and over a first return pulley (26) fixed to the vehicle (16) and a second towing section (32.2), in all ways separate from the first towing section and passing over
(Continued)

the return pulley (26) and over a second pulley (20.2) of the upstream station (10).

26 Claims, 7 Drawing Sheets

(51) Int. Cl.
| | |
|---|---|
| *B61D 3/16* | (2006.01) |
| *B61B 12/00* | (2006.01) |
| *B61B 12/02* | (2006.01) |
| *B61B 12/12* | (2006.01) |
| *B61B 15/00* | (2006.01) |
| *B65G 23/38* | (2006.01) |
| *B61F 3/10* | (2006.01) |
| *B61B 12/10* | (2006.01) |

(52) U.S. Cl.
CPC .......... *B61B 12/022* (2013.01); *B61B 12/122* (2013.01); *B61B 15/00* (2013.01); *B61D 3/166* (2013.01); *B61F 3/10* (2013.01); *B65G 23/38* (2013.01); *B61B 12/026* (2013.01); *B61B 12/028* (2013.01); *B61B 12/105* (2013.01)

(58) Field of Classification Search
CPC ......... B61B 12/122; B61B 15/00; B61B 9/00; B61B 12/10; B61B 7/045; B61B 12/125; B61B 7/04; B61D 3/166; B61F 3/10; B61F 5/02; B65G 23/38; B66D 1/50
USPC .......... 104/112, 113, 117.1, 173.1, 174, 175, 104/176; 212/316, 321, 312, 322, 324; 105/163.1, 163.2
See application file for complete search history.

(56) References Cited

U.S. PATENT DOCUMENTS

| | | |
|---|---|---|
| 767,837 A | 8/1904 | Sanders |
| 1,412,575 A | 4/1922 | Sessoms |
| 2,523,113 A | 9/1950 | Hanna et al. |
| 3,747,718 A | 7/1973 | Gauchet |
| 3,789,774 A | 2/1974 | Wilk |
| 3,827,373 A | 8/1974 | Mouneydiere |
| 3,877,391 A | 4/1975 | Gimperlein et al. |
| 4,078,500 A | 3/1978 | Zuppiger |
| 4,693,186 A | 9/1987 | Lisa |
| 4,785,739 A | 11/1988 | Huon de Kermadec |
| 5,626,247 A * | 5/1997 | Hakala .................. B66C 11/18 212/322 |
| 6,170,613 B1 | 1/2001 | Privé |
| 8,579,261 B1 | 11/2013 | Liau |

FOREIGN PATENT DOCUMENTS

| | | |
|---|---|---|
| DE | 2505561 A1 | 8/1976 |
| EP | 0 692 418 A1 | 1/1996 |
| FR | 699 196 A | 2/1931 |
| FR | 2 109 225 A5 | 5/1972 |
| FR | 2 954 747 A1 | 7/2011 |
| GB | 2 057 991 A | 4/1981 |
| JP | 3-143764 | 6/1991 |
| JP | H08-133068 A | 5/1996 |
| KR | 20-0382118 Y1 | 4/2005 |
| WO | WO 94/10023 A1 | 5/1994 |
| WO | WO 2011/080423 * | 7/2011 |

* cited by examiner

FUNICULAR DRIVEN BY A CABLE WITH TWO TOWING SECTIONS AND METHOD FOR CONTROLLING SUCH A FUNICULAR

CROSS-REFERENCE TO RELATED APPLICATIONS

This application is the National Stage entry under 35 U.S.C. § 371 of International Application Number PCT/EP2015/070213 filed on Sep. 4, 2015, published on Mar. 10, 2016 under publication number WO 2016/034697 A1, which claims the benefit of priority under 35 U.S.C. § 119 of French Patent Application Number 1458266 filed Sep. 4, 2014 and French Patent Application Number 1458268 filed Sep. 4, 2014.

TECHNICAL FIELD OF THE INVENTION

The invention relates to a funicular, particularly for transporting heavy loads, such as for example confinement hoods for radioactive wastes intended to be buried in an underground site.

PRIOR ART

Document FR 2 954 747 describes a funicular designed to transport radioactive wastes between an upstream overground station and a downstream station of an underground waste landfill facility. An inclined ramp connects the upstream station to the downstream station and materialises a rail transport track and one or several counterweight tracks. A wagon runs on the transport track whereas one or several counterweights run in the opposite direction on the counterweight track. The wagon and the counterweight(s) are connected by two cables that each pass over a driving pulley, in order to give the installation redundancy with a view to increasing its safety. In order to fix an end of each cable to the wagon, the latter is equipped with a winding drum and one gripping jaw per cable. This fixing method, extremely well tried and trusted, nevertheless has the drawback of taxing the cable in a way that accelerates its ageing.

In in JP 8-133068, a funicular is described, which comprises an upstream station, a downstream station, a circulation track connecting the upstream station to the downstream station, a vehicle rolling on the circulation track, the vehicle being provided with a tension balancing system formed by a drum, to which the ends of two cable sections that link the vehicle to the upstream station are affixed, wherein the two cable sections are wound in opposite directions on the drum, so that the extension of one of the cable sections leads to a rotation of the drum that balances the tensions on the two cable sections.

In an entirely different context illustrated by document EP 0 692 418 B1, cable cars for transporting passengers are known, comprising two suspension cables arranged on either side of the cabin and above the latter, on which a pendulum carriage on which a cabin is suspended travels, in addition to a closed-loop towing cable, a first section of which is pulled between a first compensation pulley mounted on the cabin and a first idle pulley located in a downstream station, wherein a second section is pulled between the first idle pulley of the downstream station and a first driving pulley situated in an upstream station, wherein a third section is pulled between the first driving pulley and a second compensation pulley mounted on the cabin, wherein a fourth section is pulled between the second compensation pulley and a third compensation pulley mounted on the cabin, wherein a fifth section is pulled between the third compensation pulley and a second driving pulley situated in the upstream station, wherein a sixth section is pulled between the second driving pulley and a second idle pulley situated in the downstream station, wherein a seventh section is pulled between the second idle pulley situated in the downstream station and a fourth compensation pulley mounted on the cabin and wherein an eighth section is pulled between the fourth compensation pulley and the first compensation pulley. The axes of rotation of the compensation pulleys are all vertical, wherein the first and second compensation pulleys are coaxial and located laterally on one side of the cabin whereas the third and fourth compensation pulleys are likewise coaxial, but situated on the other side of the cabin. This arrangement of the suspension cables and of the sections of the towing cable laterally outside and on either side of the cabin makes it possible to increase lateral stability and in particular reduce lateral oscillations while reducing the distance between the carriage and the cabin. Furthermore, the path of the towing cable allows balancing of the traction exerted on the cabin by the sections of cable. This solution is not however intended to be transposed to the transport of heavy loads, since on the one hand, the cabin is suspended and on the other hand, the curved path imposed on the towing cable and particularly its passage over small-diameter compensation pulleys, restricts the section of the cable.

DISCLOSURE OF THE INVENTION

The invention aims to solve the drawbacks of the prior art and propose a device and a method of coupling between a travelling vehicle and a towing cable that dispenses with gripping jaws on the vehicle.

For this purpose, a first aspect of the invention proposes a funicular comprising an upstream station, a downstream station, a track, preferably a railway, connecting the upstream station to the downstream station, a vehicle running on this track, at least one towing cable in closed loop having a first towing section passing over a first pulley of the upstream station and over a return pulley fixed to the vehicle, a second towing section, in all ways separate from the first towing section and passing over the return pulley and over a second pulley of the upstream station, a first linking section towed between the first pulley of the upstream station and a first pulley of the downstream station, a second linking section towed between the second pulley of the upstream station and a second pulley of the downstream station, a first return section towed between the first pulley of the downstream station and a second return pulley situated on the vehicle and a second return section towed between the second pulley of the downstream station and the second return pulley.

Replacing the gripping jaws of the prior art with a large-diameter pulley overcomes the potential problems of cable fatigue at the gripping jaw on the vehicle.

The first towing section and the second towing section of the cable run along the track, preferably substantially parallel to the latter and parallel to each other, spaced apart in a manner that is preferably substantially constant in their portion situated along the track. The towing cable is preferably wound around the first return pulley in a circular arc of more than 120° and of less than 360°, preferably of more than 160°, preferably of less than 200° and preferably of approximately 180°. The diameter of the pulley, which is preferably substantially equivalent to the distance between the first and second towing section of the cable, is dimensioned such as to ensure a maximum radius of curvature of the cable compatible with the section of the cable according to normative provisions. This is the reason why the pulley is large in diameter and in practice has a diameter greater than half and preferably greater than two thirds of the width of the vehicle.

Preferably, the vehicle comprises at least one undercarriage having a track width for running on the track, wherein the first return pulley has a diameter greater than half of the track width and preferably greater than two thirds of the track width.

According to one embodiment, the funicular comprises at least one weight for tensioning the cable. The weight(s) can advantageously be arranged in one or two wells so as to obtain an adequate vertical displacement. Each weight is preferably suspended on the associated section of cable by means of a pulley, which preferably has a diameter of at least the same magnitude as that of the return pulley.

According to one embodiment, the towing cable is wound around the first pulley of the upstream station and around the second pulley of the upstream station in an arc of more than 120° and of less than 360°, preferably of more than 180°, preferably of more than 225° and preferably of more than 240°.

In order to achieve these wide angles, provision can be made for the cable's comprising at least one linking section that crosses the first towing section and the second towing section, preferably in a portion of the installation outside the tracks, preferably in a part of the upstream station upstream from the track.

The funicular is preferably provided with first driving means for the first towing section of the cable and with second driving means for the second towing section of the cable, which are preferably independent. These driving means may comprise motors of any appropriate type, turning driving pulleys and be situated at any appropriate location, particularly in the upstream station or in the downstream station. According to a particularly advantageous embodiment, the first pulley of the upstream station is a driving pulley, the axle of which is driven by a motor and the second pulley of the upstream station is a driving pulley, the axle of which is also driven by a motor. Although it is conceivable to drive both driving pulleys of the upstream station using the same motor, it is preferred to use two different motors in order to provide the installation with a certain redundancy.

The funicular is preferably provided with at least a first brake to lock the first towing section and a second brake to lock the second towing section. These brakes may be incorporated in the driving means, for example in order to brake and arrest rotation of a towing pulley. They may also involve brakes acting on the cable or a combination of different types of brake.

These brakes allow the installation to operate in a degraded mode with a single motor if the other motor fails. All that is needed in this case is to block the towing cable associated with the failed motor and drive the vehicle solely using the second towing section and the other motor.

During operation, the driving means are intended to drive both towing sections of the towing cable. The return pulley, which is capable of rotating, allows balancing of the forces exerted on the towing sections. It may be chosen to control the driving pulleys with a relative motion (i.e. with a difference in rotation speed), so as to impose slow rotation on the return pulley, in order for example to avoid always taxing the same portion of the cable. It may also be chosen to control the driving pulleys such that the return pulley does not rotate during travel, but rotation is imparted to the return pulley during a halt, for example when empty, in the upstream station or in the downstream station.

In practice, the track defines a path for the vehicle and an axis for this path, which will be merged with a so-called longitudinal axis of the vehicle. The axis of the path is oblique and preferably rectilinear between the upstream station and the downstream station. For the purposes of the description, a second axis, a so-called transverse axis, of the vehicle is defined, horizontal and perpendicular to the longitudinal axis. Finally, a third reference axis is defined, perpendicular to the two preceding axes.

The vehicle preferably comprises a platform on which the load rests during its transport. In practice, the platform is horizontal, whereas the track forms an angle, preferably constant, with the horizontal.

The first return pulley rotates around an axis that is positioned on the vehicle, preferably in the part of the vehicle located upstream from the platform, i.e. between the upstream station and the platform.

The vehicle preferably comprises a chassis bearing the platform and resting on an upstream undercarriage and on a downstream undercarriage, situated longitudinally on either side of the platform, the upstream undercarriage between the platform and the upstream station and the downstream undercarriage between the platform and the downstream station. The axis of rotation of the first return pulley is preferably situated between the upstream undercarriage and the downstream undercarriage, or at least between an upstream longitudinal end of the upstream undercarriage and a downstream end of the downstream undercarriage.

According to one embodiment, the axis of rotation of the first return pulley can be perpendicular to the longitudinal axis of the vehicle, or preferably oblique in relation to the longitudinal axis, with an angle preferably included between 80° and 100°. Guide rollers may also be provided on the vehicle in order to guide each of the first and second towing sections towards the return pulley. These guide rollers preferably include at least one first guide roller associated with the first towing section and situated above the first towing section, in addition to a second guide roller associated with the second towing section and situated above the second towing section.

According to a preferred embodiment, the axis of rotation of the first return pulley is perpendicular to a transverse axis of the vehicle, in the median longitudinal vertical plane of the vehicle.

The two towing sections of the cable are preferably situated in the same plane parallel to the track and perpendicular to a median longitudinal vertical plane of the vehicle.

Alternatively, it is also conceivable that the axis of rotation may be parallel to the transverse axis of the vehicle. In this case, the plane defined by the longitudinal axis and the axis of rotation is preferably situated close to the centre of gravity of the unloaded vehicle.

According to one embodiment, the track comprises two parallel rails spaced apart from each other. Preferably, a service corridor is positioned between the two rails. In this case, the first and second towing sections of the cable are preferably arranged in the corridor.

Both return pulleys are preferably of the same diameter. They may be coaxial and situated approximately halfway between the two longitudinal ends of the vehicle or, according to a preferred embodiment, be non-coaxial and particularly situated longitudinally spaced apart from one another, on either side of the load transport platform, if appropriate.

Preferably, the axes of rotation of the return pulleys are non-parallel and preferably secant in a median longitudinal vertical plane of the vehicle.

According to another aspect of the invention, the latter refers to a method for controlling a funicular as described above, wherein the first towing section and the second towing section are driven at the same linear speed. Control is particularly easy in this case and the return pulley(s) ensures/ensure balancing in the tension of the sections of the cable.

According to another embodiment, the first towing section and the second towing section are driven so as to cancel the rotation speed of the first return pulley, which can be measured by a return pulley rotation sensor.

According to another embodiment, the first towing section and the second towing section are driven so as to impose rotation of the first return pulley.

According to another embodiment, the first towing section and the second towing section are driven so as to cause rotation of the first return pulley without any movement of the vehicle. This cable circulation regimen without movement of the vehicle can be advantageously employed in one of the upstream or downstream stations, in order to ensure that all the portions of the cable are taxed in the same way during the life of the installation.

According to a degraded operating mode specific to installations with a closed-loop cable, only one of the towing sections is driven, the other being idle, in order to move the wagon at slow speed.

According to another aspect of the invention, the latter refers to a vehicle designed to run on a railway-type track, particularly a vehicle for a funicular according to the first aspect of the invention, in any of the configurations according to the various different embodiments discussed and comprising a chassis defining a median longitudinal vertical plane. The chassis rests on at least one pendulum running gear, comprising two independent lateral pendulum devices situated on either side of the median longitudinal vertical plane. Each lateral pendulum device comprises:
- a secondary pendulum articulated in relation to the chassis around a horizontal secondary pivot axis and
- two primary pendulums, wherein each of the two primary pendulums is articulated in relation to the second pendulum around a horizontal primary pivot axis, wherein the primary pivot axes of the two primary pendulums are spaced apart from each other, longitudinally on either side of the secondary pivot axis, where in each primary pendulum is associated with at least two support rollers designed to run on the railway-type track, each rotating around a rotation axis parallel to the primary pivot axis of the associated primary pendulum and situated longitudinally on either side of the primary pivot axis of the associated primary pendulum.

The arrangement of the primary and secondary pendulums of each lateral pendulum device serves to balance the forces exerted on the support rollers and therefore distribute the vehicle weight over a large number of support rollers. This aspect of the invention is the subject of concomitant submission of another International patent application, to which the reader will refer.

More generally, the content of the prior applications, the priority of which is claimed in the present application, is integrally included in the present application by reference.

BRIEF DESCRIPTION OF THE FIGURES

Further characteristics and advantages of the invention will be clear from reading the following description, made in reference to the appended figures, which show.

For greater clarity, identical or similar features are identified by identical reference signs in all the figures.

DETAILED DESCRIPTION OF THE EMBODIMENTS

Figure 1:
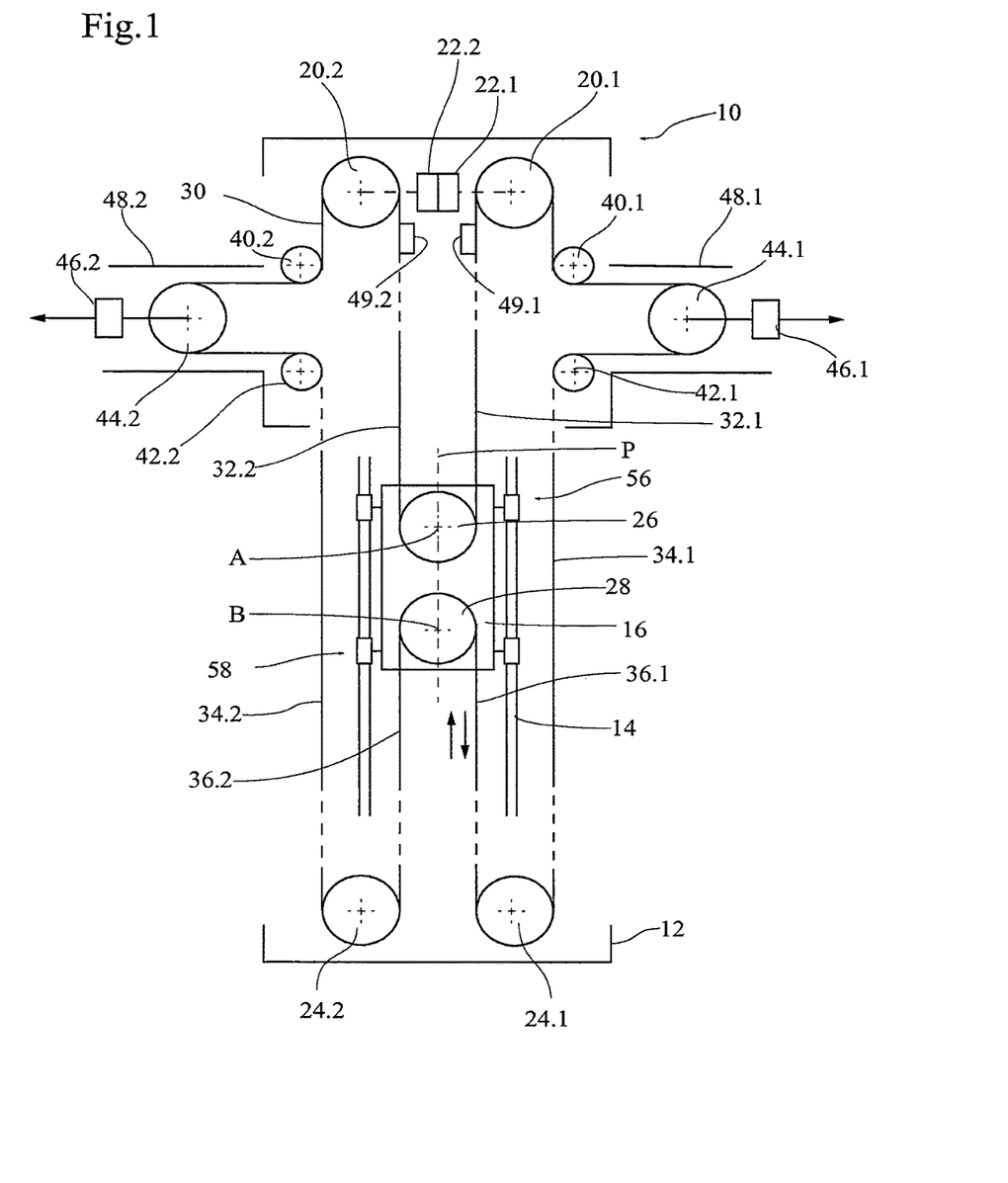
FIG. 1, a diagrammatic view of a funicular according to an embodiment of the invention.

In FIG. 1, a diagrammatic and simplified illustration is provided of a funicular comprising an upstream station 10, a downstream station 12 and a track 14, preferably a railway, along which a single vehicle 16 travels back and forth, designed to transport a load interchangeably from the upstream station 10 to the downstream station 12 or from the downstream station 12 to the upstream station 10. The track 14 preferably has a constant incline between the upstream station 10 and the downstream station 12.

The upstream station 10 is equipped with two driving pulleys 20.1, 20.2, powered by motor means 22.1, 22.2, which may be common or separate for each pulley.

The downstream station 12 is also equipped with two pulleys 24.1, 24.2, freely rotating, turning around axes parallel to those of the driving pulleys of the upstream station 10.

The vehicle 16 is in turn equipped with two large-diameter return pulleys 26, 28, freely rotating around two axes A, B situated in a median longitudinal median plane P of the vehicle 16. The return pulleys 26, 28 are arranged at a distance from another along the path of the vehicle, one on the side of the upstream station 10 and the other on the side of the downstream station 12.

A closed-loop cable 30 is towed between the return pulleys 26, 28 of the vehicle 16 and the pulleys 20.1, 20.2, 24.1, 24.2 of the upstream and downstream stations. More specifically, the cable 30 comprises a first towing section 32.1 towed between the upstream return pulley 26 of the vehicle 16 and a first pulley (20.1) of those of the upstream station 10, a first linking section 34.1 towed between the first driving pulley 20.1 and a first pulley of those of the downstream station 24.1, a first return section 36.1 towed between the first pulley of the downstream station 24.1 and the downstream return pulley 28 situated on the vehicle 16, a second return section 36.2 towed between the downstream return pulley 28 and the second pulley of the downstream station 24.2, a second linking section 34.2 towed between the second pulley of the downstream station 24.2 situated in the downstream station and the second driving pulley 20.2 of the upstream station 10 and a second towing section 32.2 between the second driving pulley 20.2 and the upstream return pulley 26 of the vehicle 16, thereby closing the loop.

Optionally, each of the two linking sections 34.1, 34.2 passes through a tensioning device 38.1, 38.2 comprising an upstream guide pulley 40.1, 40.2, a downstream guide pulley 42.1, 42.2 and a mobile pulley 44.1, 44.2 bearing a weight 46.1, 46.2 moving in a vertical well 48.1, 48.2. In the diagrammatic representation in 1, the spatial orientations of the pulleys and the path of the cable have not necessarily been respected, but will be more readily apparent from FIGS. 2 to 10.

Provision is also made for cable braking devices 49.1, 49.2, which may for example act on the driving pulleys 20.1, 20.2., or on the towing sections 32.1, 32. of the cable.

The vehicle 16, illustrated in detail in FIGS. 2 to 5, comprises a chassis 50 on which a horizontal platform 52 bearing the load 54 is formed. It is possible to define a longitudinal axis X of the vehicle parallel to the direction of the rectilinear path, a transverse axis Y, perpendicular to the above axis and horizontal and a third reference axis Z of the vehicle, perpendicular to the above axes and the track. The chassis 50 rests on an upstream running gear 56 and a downstream running gear 58. Each running gear is composed of two independent lateral pendulum devices 60. Each lateral pendulum device 60 comprises a secondary pendulum 62 mounted to pivot around an axis 62.1 on a plate 64 fixed to the chassis via two jacks 66 and two primary pendulums 68 articulated in relation to the secondary pendulum 62 around pivot axes 68.1 and on each of which two support rollers 70 are mounted running on the track 14 and rotating around axes 70.1. The jacks 66, which are oriented along axis Z perpendicular to the track 14, do not have a filtering suspension function, but allow raising of the chassis 50 above the ground for its setting in motion and its lowering in contact with the ground of the track 14 when stationary for the loading and unloading phases in the station or when moving for emergency braking. The pivot axes 68.1 of the primary pendulums 68 are arranged longitudinally on either side of the secondary pivot axis 62.1 and the rotation axes 70.1 longitudinally on either side of the primary pivot axis 68.1, which allows balancing of the forces exerted by the support rollers 70 on the track. On one side of the vehicle, the rollers 70 are cylindrical, whereas on the other, they are provided with lateral guide flanges 70.2 to allow compensation for any slight variations in the spacing between the rails. Each roller 70 may also be equipped with a brake 70.3.

Figure 2:
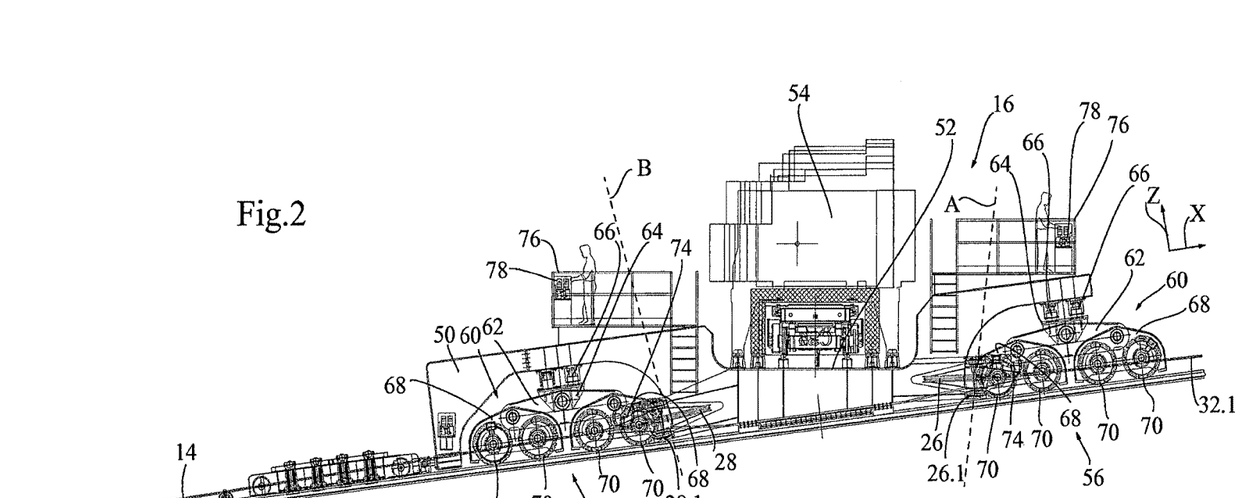
FIG. 2, a side view of a vehicle of the funicular of FIG. 1.
Figure 3:
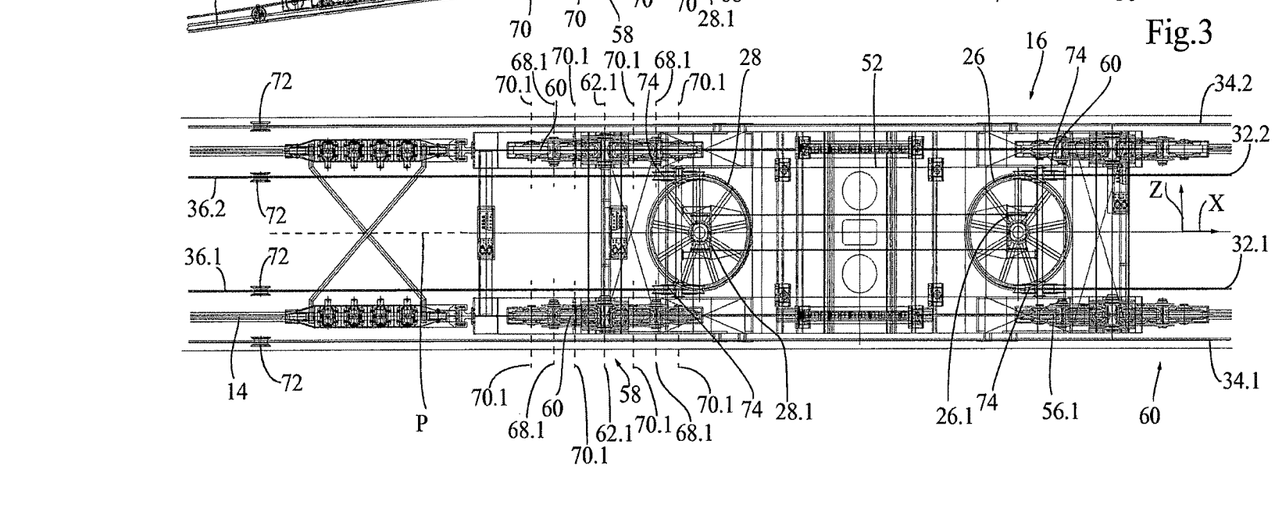
FIG. 3, a top view of the vehicle in FIG. 2.
Figure 4:
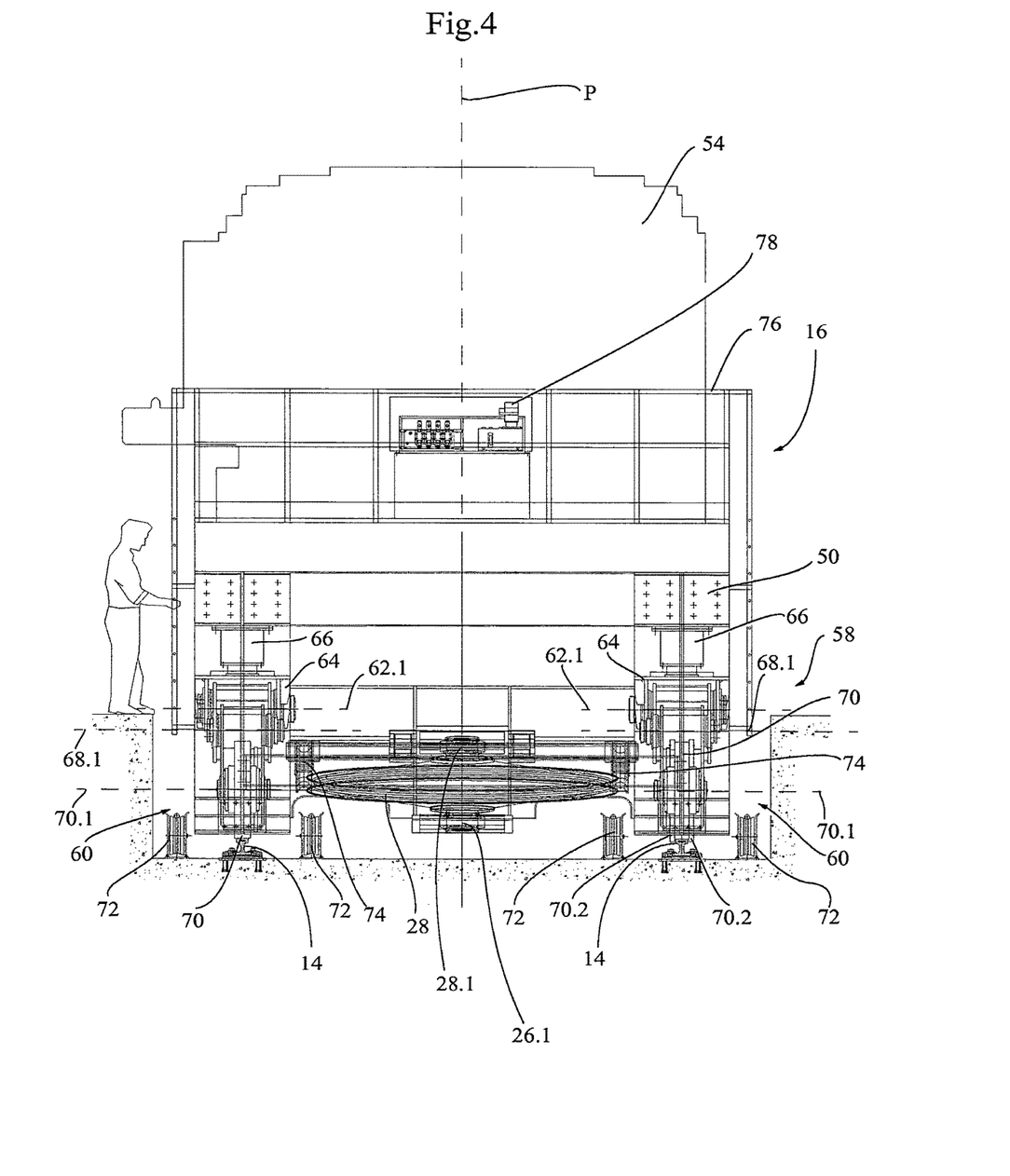
FIG. 4, a front view of the vehicle in FIG. 2.
Figure 5:
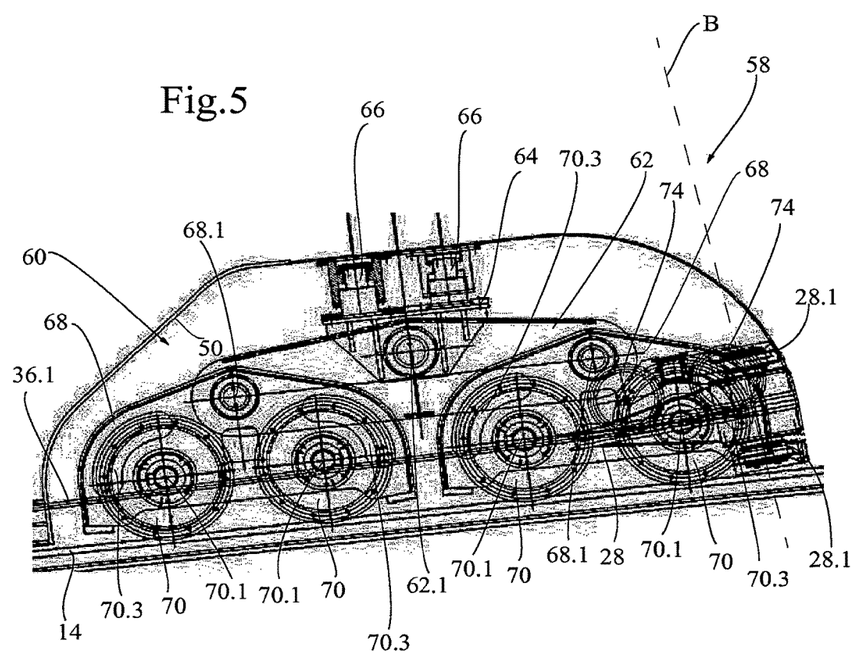
FIG. 5, a detailed view of FIG. 2.

One can see in FIGS. 2 to 4 the positioning of the two large-diameter return pulleys 26, 28, on the chassis, above the track and rotating around two axes A, B situated in the longitudinal median plane and slightly angled in relation to the axis Z perpendicular to the track. The return pulleys are guided in relation to the chassis 50 by bearings 26.1, 28.1, spaced apart from one another along the path of the vehicle. In this case, the bearings 26.1 of the upstream return pulley 26 linking the vehicle to the upstream station, is situated upstream from the bearings 28.1 of the downstream return pulley 28 linking the vehicle to the downstream station 12. Furthermore, the bearings 26.1, 28.1 are situated longitudinally between the secondary pivot axes 62.1 of the upstream running gear 56 and downstream running gear 58. Guide rollers 72 are arranged along the track to support the cable 30. Return pulleys 26, 28 are arranged above the guide rollers 72. The chassis 50 is equipped with orientation rollers 74 allowing the cable 30 to be raised and oriented in the oblique plane of the return pulleys 26, 28.

The vehicle may also be equipped with upstream and downstream driver's cabins 76, each provided with a control console 78. The chassis 50 of the vehicle 16 features wear skids 80 which, when the jacks 66 are lowered, rest on the ground.

Figure 6:
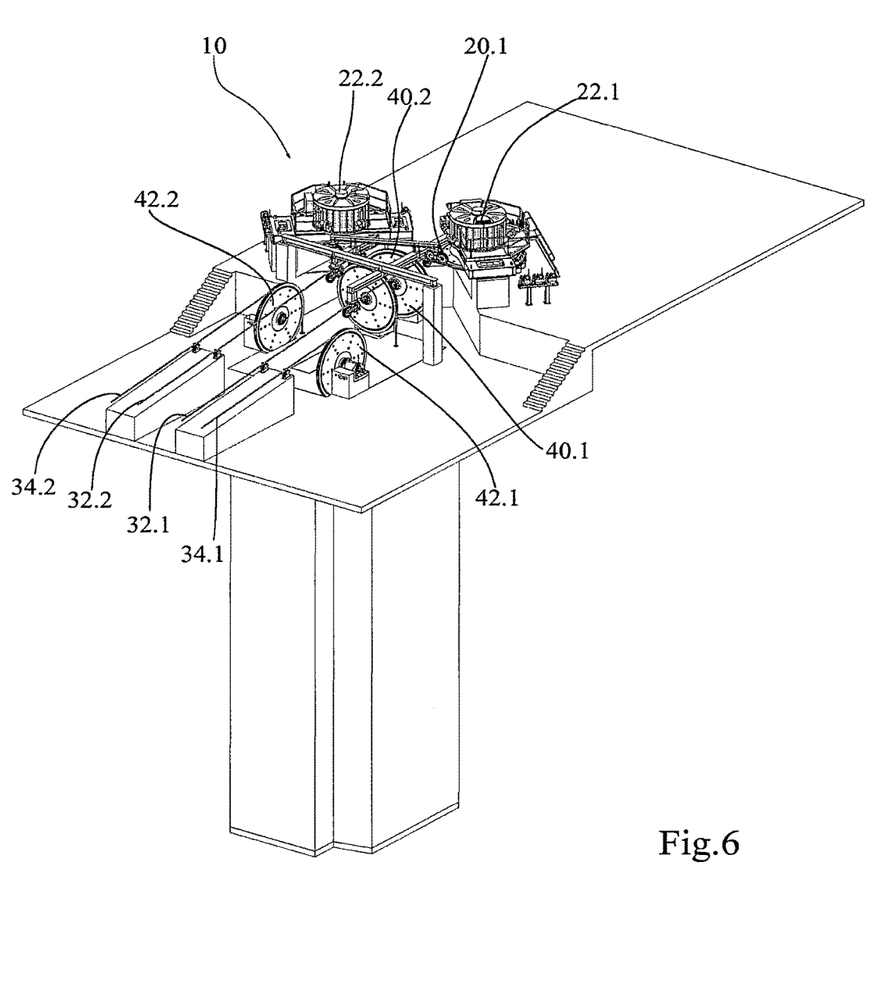
FIG. 6, an isometric view of a part of an upstream station of the funicular in FIG. 1.
Figure 7:
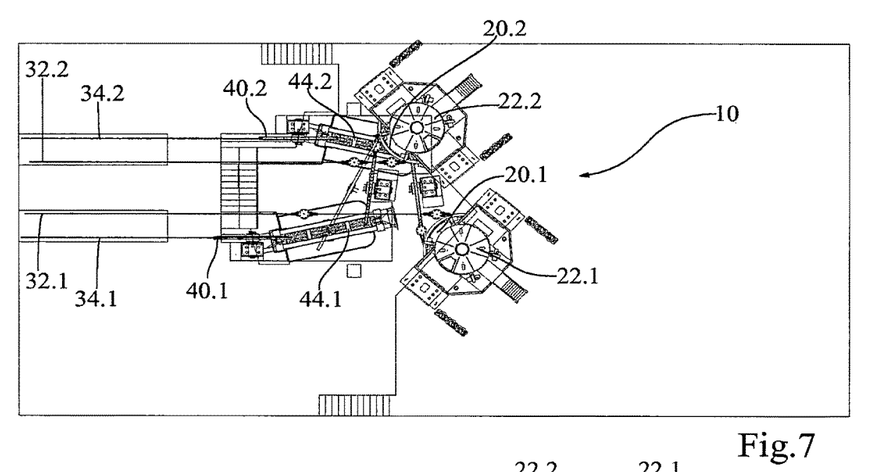
FIG. 7, a top view of the upstream station in FIG. 5.
Figure 8:
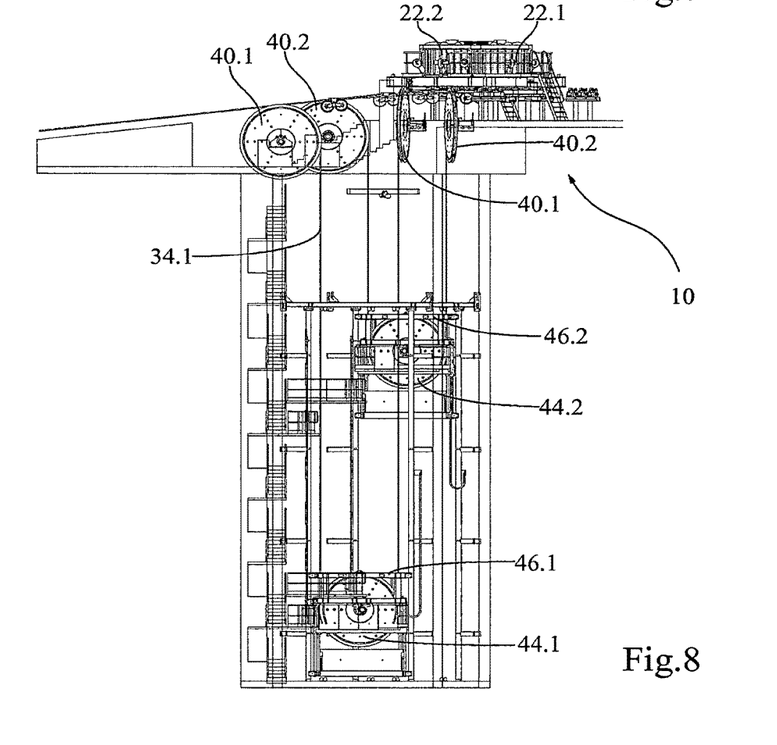
FIG. 8, a side view of the upstream station in FIG. 6.

FIGS. 6 to 8 allow visualisation of the path of the cable in the upstream station. The first towing section 32.1 enters the station along a path situated essentially in a vertical plane parallel to the axis X of the path from the return pulley 26 to the driving pulley 20.1. The same applies to the second towing section 32.2 between the return pulley 26 and the second driving pulley 20.2. On leaving the first driving pulley 20.1, the first linking section 34.1 of the cable crosses the two towing sections 32.1 and 32.2 and is diverted by the upstream guide pulley 40.1 towards the mobile pulley 44.1 in the well 46.1, re-emerging and being guided by the downstream guide pulley 42.1 so as to run along a vertical plane parallel to the path of the vehicle 16, to the downstream station 12. The second linking section 34.2 follows a similar path, crossing the two towing sections 32.1, 32.2 and being diverted by the upstream guide pulley 40.2 towards the mobile pulley 44.2 in the well 46.2, re-emerging and being guided by the downstream guide pulley 42.2 so as to run along a vertical plane parallel to the path of the vehicle 16, to the downstream station 12. Crossing of the linking sections 34.1 34.2 with the towing sections 32.1, 32.2 in the upstream station 10 ensures contact between the cable 30 and each of the driving pulleys 20.1, 20.2 over more than 180° and in practice over more than 225° and preferably over more than 240°. In this embodiment, the upstream driving pulleys, the downstream guide pulleys and the mobile pulleys have horizontal rotation axes, whereas the driving pulleys have vertical axes.

Figure 9:
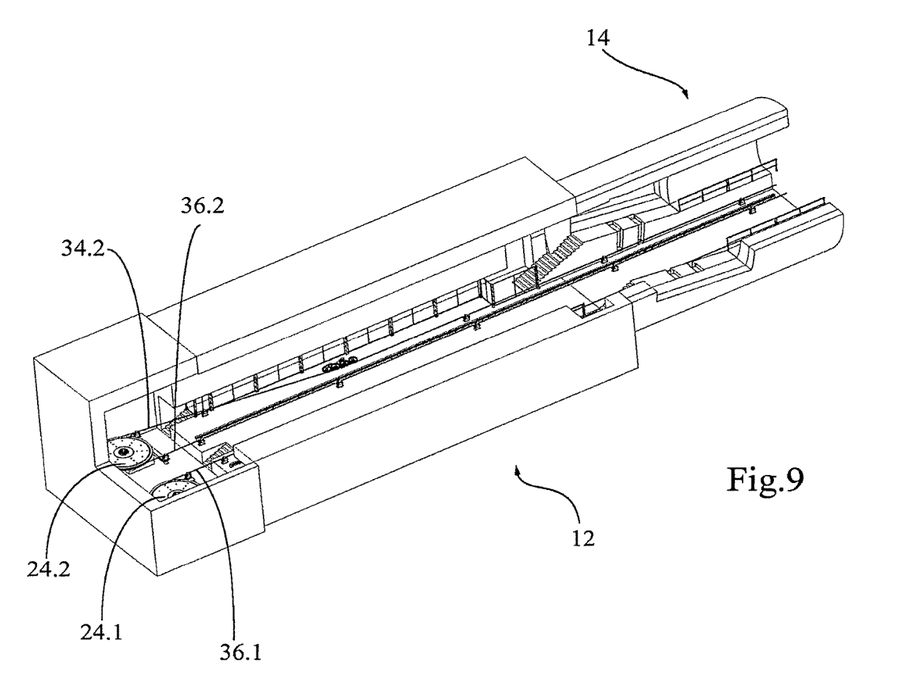
FIG. 9, an isometric view of a downstream station of the funicular in FIG. 1.
Figure 10:
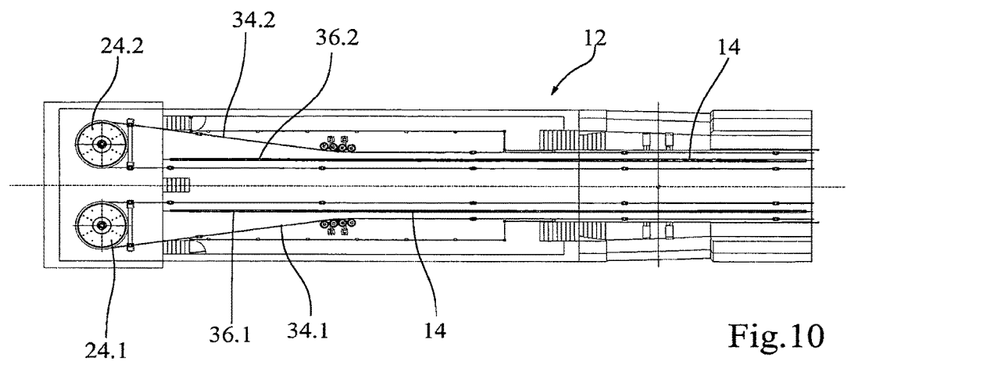
FIG. 10, a top view of the downstream station in FIG. 1.

FIGS. 9 and 10 illustrate the downstream station 12 equipped with the two pulleys 24.1, 24.2, freely rotating, turning around vertical axes. The diameters of the driving pulleys 20.1, 20.2 of the upstream station and of the idle pulleys 24.1, 24.2 of the downstream station are preferably substantially identical. As illustrated by FIGS. 2 to 10, the linking sections 34.1, 34.2, in their path along the track 14, flank the towing sections 32.1, 32.2 and the return sections 36.1, 36.2.

The symmetry of the installation is such that in theory, if the two driving pulleys 20.1, 20.2 are driven at equal speed in opposite directions and assuming the dynamic elastic deformations of the cable identical on either side, the vehicle 16 is driven in an ascending or descending direction, without the return pulleys 26, 28 rotating. In practice, the conditions for perfect symmetry are not achieved, owing for example to the differences in perimeter of the driving pulleys and rotation of the return pulleys 26, 28 allows dynamic balancing of the forces exerted on the sections of the cable 30. It may also be chosen to control the driving pulleys 20.1, 20.2 with a speed difference, so as to cause constant rotation of the return pulleys 26, 28, as discussed above. This speed difference may be constant or variable, particularly periodically.

It is also noted that the relative position of the bearings 26.1, 28.1 allows, in case of a slight lack of alignment of the vehicle in relation to the track, generation of a compensating torque on the chassis 50 of the vehicle, thereby bringing the vehicle back into alignment. The positioning of the bearings 26.1 upstream from the centre of gravity of the vehicle when empty and upstream from the platform 52 bearing the load 54 also ensures correct orientation of the vehicle on the track, both when loaded and when empty, to the extent that the centre of gravity of the vehicle 16 when empty is in the median longitudinal plane and that the load 54 is also positioned such that its centre of gravity is in the median longitudinal plane.

In the event of failure of one of the motors 22.1, 22.2, the corresponding brake 49.1, 49.2 can be operated and the vehicle 16 can be driven at low speed by the other motor.

In order to control the funicular according to the invention, it is possible to resort to different sensors in order to measure different status variables of the installation and more particularly: sensors measuring the speed or rotation of the driving pulleys 20.1, 20.2, sensors measuring the speed or rotation of the pulleys 24.1, 24.2 of the downstream station, sensors measuring the speed or rotation of the return pulleys 26, 28, extensometric sensors detecting stretching of the different sections of the cable or some thereof, sensors measuring the resulting force on the axis of the upstream return pulley 26, sensors measuring the speed of the vehicle 16 and sensors measuring the motor torque of the driving pulleys 20.1, 20.2.

Naturally, various modifications are possible. It is possible in particular to double the installation, so as to ensure redundancy in towing.

The tensioning devices are not necessary positioned on the towing sections, but may be alternatively placed on the linking sections or the return sections. The drive motors may be arranged in the downstream station. Motorisation divided between the two stations may also be contemplated.

The invention claimed is:

1. A funicular comprising an upstream station, a downstream station, a track connecting the upstream station to the downstream station, a vehicle running on the track, wherein the funicular comprises at least one towing cable in closed loop having a first towing section passing over a first pulley of the upstream station and over a first return pulley fixed to the vehicle, a second towing section, which has no common part with the first towing section and passes over the first return pulley and over a second pulley of the upstream station, a first linking section extending between the first pulley of the upstream station and a first pulley of the downstream station, a second linking section extending between the second pulley of the upstream station and a second pulley of the downstream station, a first return section extending between the first pulley of the downstream station and a second return pulley situated on the vehicle and a second return section extending between the second pulley of the downstream station and the second return pulley, wherein the vehicle comprises at least one undercarriage having a track width for running on the track, wherein the first return pulley has a diameter greater than half of the track width.

2. The funicular of claim 1, wherein the towing cable is wound around the first return pulley in a circular arc of more than 120° and of less than 360°.

3. The funicular of claim 1, wherein the first return pulley has a diameter greater than half a width of the vehicle.

4. The funicular of claim 1, wherein the first return pulley has a diameter greater than two thirds of the track width.

5. The funicular of claim 1, further comprising at least one weight for tensioning the cable.

6. The funicular of claim 1, wherein the towing cable is wound around the first pulley of the upstream station and around the second pulley of the upstream station in an arc of more than 120° and of less than 360°.

7. The funicular of claim 1, wherein the cable comprises at least one linking section, which, is a plan view, crosses the first towing section and the second towing section.

8. The funicular of claim 1, further comprising a first motor for the first towing section and second motor for the second towing section.

9. The funicular of claim 1, further comprising a first brake to lock the first towing section and a second brake to lock the second towing section.

10. The funicular of claim 1, wherein the vehicle comprises a platform for transporting a load.

11. The funicular of claim 1, wherein the first return pulley has a rotation axis oblique in relation to a longitudinal axis of the vehicle.

12. The funicular of claim 1, wherein the first return pulley has a rotation axis perpendicular to a transverse axis of the vehicle.

13. The funicular of claim 1, wherein the two return pulleys have the same diameter.

14. The funicular of claim 1, wherein the two return pulleys have rotation axes that are not identical.

15. The funicular of claim 1, wherein the track is a railway.

16. The funicular of claim 2, wherein the towing cable is wound around the first return pulley in a circular arc of more than 160°.

17. The funicular of claim 2, wherein the towing cable is wound around the first return pulley in a circular arc of less than 200°.

18. The funicular of claim 3, wherein the first return pulley has a diameter greater than two thirds of the width of the vehicle.

19. The funicular of claim 6, wherein the towing cable is wound around the first pulley of the upstream station and around the second pulley of the upstream station in an arc of more than 180°.

20. The funicular of claim 1, wherein the return pulleys have rotation axes that are not parallel.

21. The funicular of claim 1, wherein the return pulleys have rotation axes that are secant.

22. A funicular comprising an upstream station, a downstream station, a track connecting the upstream station to the downstream station, a vehicle running on the track, wherein the funicular comprises at least one towing cable in closed loop having a first towing section passing over a first pulley of the upstream station and over a first return pulley fixed to the vehicle, a second towing section, which has no common part with the first towing section and passes over the first return pulley and over a second pulley of the upstream station, a first linking section extending between the first pulley of the upstream station and a first pulley of the downstream station, a second linking section extending between the second pulley of the upstream station and a second pulley of the downstream station, a first return section extending between the first pulley of the downstream station and a second return pulley situated on the vehicle and a second return section extending between the second pulley of the downstream station and the second return pulley, wherein the vehicle comprises at least one undercarriage having a track width for running on the track, further comprising a first motor for driving the first towing section and second motor for driving the second towing section independently from the first towing section.

23. A method of controlling the funicular of claim 22, comprising one of the following steps, carried out in an operational functioning mode:
 driving the first motor and the second motor so as to drive the first towing section and the second towing section at the same linear speed;
 driving the first motor and the second motor so as to cancel the rotation speed of the first return pulley;
 driving the first motor and the second motor so as to impose rotation on the first return pulley;
 driving the first motor and the second motor so as to impose a periodic rotation speed on the first return pulley;

driving the first motor and the second motor so as to cause rotation of the first return pulley without any movement of the vehicle.

24. The method of controlling a funicular of claim 23, further comprising the following steps, carried out in a degraded operating mode;
   driving only one of the first and second motors, the other motor being stationary.

25. The funicular of claim 22, further comprising a first brake to lock the first towing section and a second brake to lock the second towing section.

26. A funicular comprising an upstream station, a downstream station, a track connecting the upstream station to the downstream station, a vehicle running on the track, wherein the funicular comprises at least one towing cable in closed loop having a first towing section passing over a first pulley of the upstream station and over a first return pulley fixed to the vehicle, a second towing section, which has no common part with the first towing section and passes over the first return pulley and over a second pulley of the upstream station, a first linking section extending between the first pulley of the upstream station and a first pulley of the downstream station, a second linking section extending between the second pulley of the upstream station and a second pulley of the downstream station, a first return section extending between the first pulley of the downstream station and a second return pulley situated on the vehicle and a second return section extending between the second pulley of the downstream station and the second return pulley, wherein the vehicle comprises at least one undercarriage having a track width for running on the track, wherein the first return pulley has a diameter greater than half a width of the vehicle.

* * * * *